United States Patent [19]

Wegmann et al.

[11] Patent Number: 4,538,449
[45] Date of Patent: Sep. 3, 1985

[54] PNEUMATIC MEASURING DEVICE FOR MEASURING WORKPIECE DIMENSION

[75] Inventors: Heinz Wegmann, Rumlang; Hans Sigg, Neuchatel, both of Switzerland

[73] Assignee: Meseltron S.A., Corcelles, Switzerland

[21] Appl. No.: 548,965

[22] Filed: Nov. 7, 1983

[30] Foreign Application Priority Data

Nov. 22, 1982 [CH] Switzerland ............... 6776/82

[51] Int. Cl.³ .............................................. G01B 13/10
[52] U.S. Cl. ..................................................... 73/37.9
[58] Field of Search ................................ 73/37.9, 37.5

[56] References Cited

U.S. PATENT DOCUMENTS

| 2,846,871 | 8/1958 | Worthen | 73/37.9 |
| 3,065,628 | 11/1962 | Gesell | 73/37.9 |
| 3,494,078 | 2/1970 | Miyamoto | 73/37.9 X |
| 3,513,688 | 5/1970 | Thibault | 73/37.9 |
| 4,088,009 | 5/1978 | Fukuda | 73/37.9 X |

FOREIGN PATENT DOCUMENTS

| 937054 | 9/1963 | United Kingdom | 73/37.9 |
| 1022145 | 3/1966 | United Kingdom | 73/37.9 |

Primary Examiner—Stewart J. Levy
Assistant Examiner—Joseph W. Roskos
Attorney, Agent, or Firm—Peter L. Berger

[57] ABSTRACT

A pneumatic measuring device is disclosed which comprises a pneumatic circuit containing a first branch (15) equipped with an inlet nozzle (16), oppositely disposed measuring nozzles (17) and a second branch (19) equipped with an inlet nozzle (20) and a reference nozzle (21). A differential pressure transducer (22) having a semiconductor element enables the difference in pressure between the branches (15) and (19) to be measured and to supply through a terminal (23) a signal representing the dimensions measured opposite the nozzles (17). The pneumatic circuit system, with the pressure transducer, is included in the measuring spindle (12).

11 Claims, 5 Drawing Figures

PNEUMATIC MEASURING DEVICE FOR MEASURING WORKPIECE DIMENSION

BACKGROUND OF THE INVENTION

This invention concerns a pneumatic device to measure the dimensions of a workpiece, and in particular to a device for taking measurements according to the differential pressure measurement procedure defined by standard DIN 2271.

As can be seen in FIG. 1, this procedure consists of feeding through a pressure regulator 1 a pneumatic circuit containing a first branch 2 equipped with an inlet nozzle 3 and a measuring nozzle or spindle 4, capable, for example, of being inserted in a bore 5, the diameter of which is to be measured, as well as a second branch 6 equipped with an inlet nozzle 7 passing out into a reference nozzle 8, the delivery of which can be adjustable. A pressure transducer 9 connected between branches 2 and 6 delivers an electric signal representing the difference in pressures prevailing in those branches, which is amplified by an amplifier 10 before being supplied, for example, to an indicator 11. It is thus clear that if the spindle 4 is inserted in a larger bore, the pressure in branch 2 will be reduced, and the variation of differential pressure detected by the transducer 9 will represent the increase in diameter of the bore 5. The essential value of the differential system is to absorb automatically the parasite pressure variations due, for example, to operation of the pressure regulator 1 or to the effects of temperature.

In the known devices, a transducer is used in which, for example, the displacement of a diaphragm is detected by an inductive pick-up connected to the latter. However, in the signal delivered by that type of transducer, a noise signal can exist which is superposed on the signal representing the dimension measured and the resulting large amplitude prevents known systems from performing precision measurements.

Furthermore, known systems are generally very sensitive to vibrations because of the presence of moving mechanical parts in the transducer, which can lead to disturbances or errors in measurement. That is why it is necessary to house most of the elements of the pneumatic circuit, including the inlet and reference nozzles as well as the transducer, in a separate box, to which the measuring spindle is connected by a duct. This houses a large volume of air which considerably lengthens the time constant of the measuring device.

Still another disadvantage of the known devices is that they are difficult to adjust. In particular, adjustment of the sensitivity of measurement is obtained by changing the geometry of the nozzles, which can lead in turn to a displacement of the linear characteristic of the measuring device and of the zero of the electric measuring signal.

That is why an object of this invention is to provide an improvement of the known devices, which considerably reduces the measurement noise, as well as the time constant and sensitivity to vibrations, while allowing a simple and independent adjustment of the sensitivity of the device and of the zero of the output signal.

SUMMARY OF THE INVENTION

To accomplish the above objects, a differential pressure transducer with semiconductor elements is used and the transducer is located in the interior of the measuring spindle. While remaining free to define the pneumatic circuit in an optimal manner, so as to limit the production of measurement noise, that solution allows for the provision of a measuring device totally insensitive to vibrations and whose time constant, on the order of one-tenth of a second, is low enough to make extremely rapid measurements, e.g., between two penetrations of a workpiece by an oscillating machine tool, or to measure discontinuous surfaces of a workpiece in motion.

DESCRIPTION OF THE DRAWING

The invention will be clearly understood by reading the specification that follows, in relation to the attached figures, among which.

DETAILED DESCRIPTION

Figure 1:
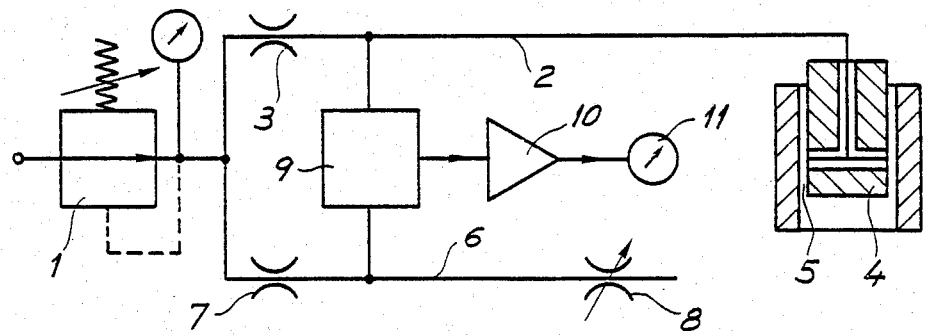
FIG. 1 is a schematic view of a pneumatic measuring device of the prior art.
Figure 2:
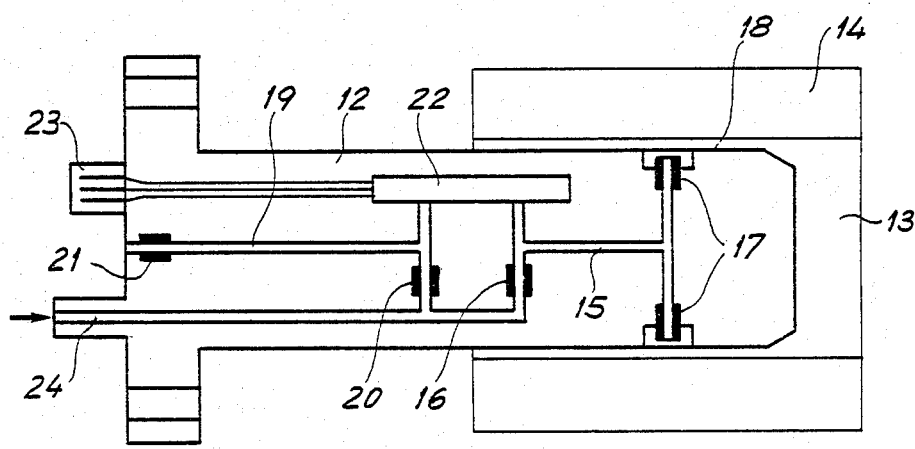
FIG. 2 is a schematic view in section of a measuring device according to a first embodiment of the invention.

On FIG. 2 a measuring spindle 12 is shown with its end engaged in the bore 13 of a workpiece 14. The pneumatic measuring device is entirely included in the spindle 12, and it contains, notably, a first branch 15 delimited by an inlet nozzle 16 and two measurement nozzles 17 arranged symmetrically on opposite sides of the cylindrical surface near one end 18 of the spindle 12, the nozzle being located opposite the walls of the bore 13 to be measured. A second branch 19 is delimited by an inlet nozzle 20 and a reference nozzle 21, which can be adjusted. The pressure difference between the branches 15 and 19 is detected by a differential pressure transducer with semiconductor element 22, electrically connected to a branch terminal 23 to detect the signal representing the differential pressure between the branches 15 and 19 of the pneumatic circuit. A duct 24 enables the inlet nozzles 16 and 20 to be connected to a regulated pressure source disposed outside the spindle 12.

The differential pressure transducer with semiconductor element 22 used in the measuring device consists essentially of a semiconductor strip in which a diaphragm has been formed by chemical shaping procedures, as well as a bridge of piezoresistors formed on the diaphragm, along with amplifying elements formed on the strip. Such pressure transducers and their fabrication are described, for example, in French patent application No. 2,266,314, and they are distributed, in particular, by National Semiconductor Corporation and Honeywell. The small size of the transducer 22 enables it to be integrated very easily with the measuring spindle 12, so as substantially reduce the volume of air circulating in the pneumatic circuit. Furthermore, the branches 15 and 19 of the pneumatic circuit whose pressures are being compared are in immediate proximity to each other and, consequently, subjected to the same temperature, which largely eliminates temperature influences on the resulting measurements.

According to another aspect of the invention, it is advantageous to dimension the reference nozzle 21 so that the differential pressure between the two branches is nil when the dimensions of the workpiece 14 reach their standard values. In fact, the stability and precision of measurement of the dimensions are at a maximum when that differential pressure is close to zero. The preceding arrangement ensures that maximum precision is obtained, e.g. in the course of machining, when standard dimensions are realized.

Figure 3:
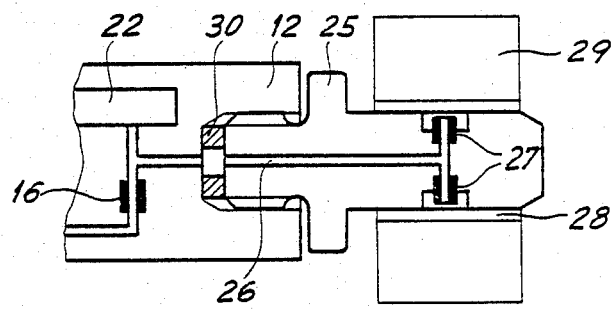
FIG. 3 is a representation in partial section of another embodiment of the measuring device according to the invention.

FIG. 3 illustrates another embodiment of the measuring spindle 12 of FIG. 2 in which the end of the spindle has a removable tip. That tip is, for example, screwed on the end of the spindle 12, and it contains a duct 26 connecting two end nozzles 27 to the inlet nozzle 16 and to the transducer 22. Thus, the same measuring spindle 12, with the advantages resulting therefrom, can be used to measure the diameter of a small bore 28 in a workpiece 29. A ring-shaped joint 30 assures the tightness of the first branch of the pneumatic circuit.

Figure 4:
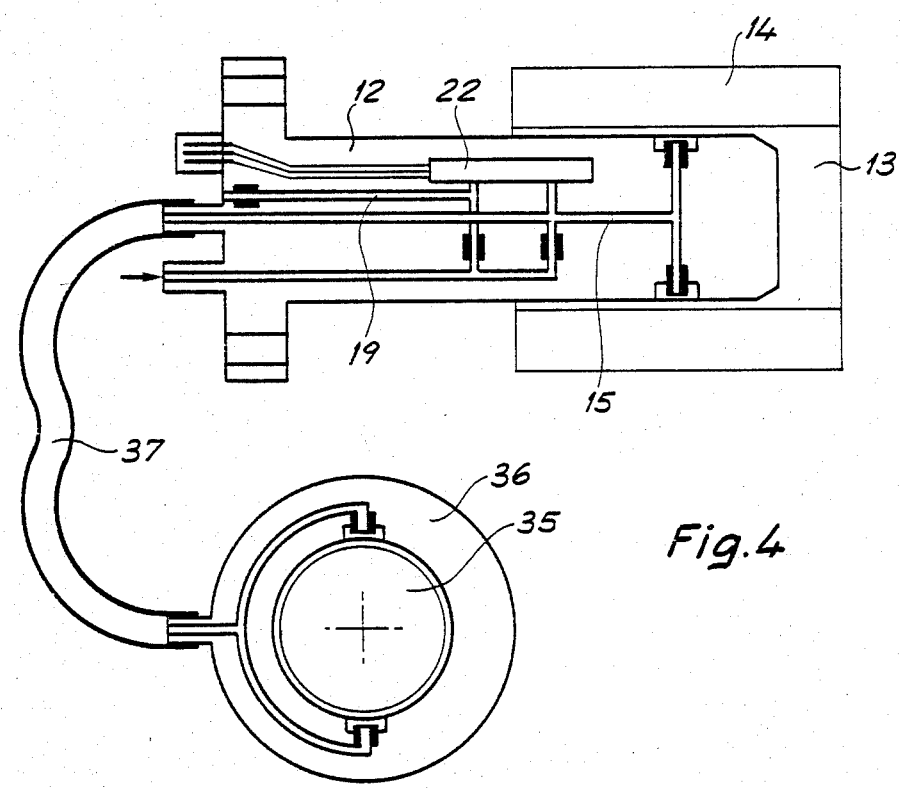
FIG. 4 is a schematic representation of still another variant of the measuring device according to the invention.

On FIG. 4 a spindle 12 identical to that of FIG. 2 is shown, but it is adapted to enable the grinding of a bore coupled to a given shaft 35. For that purpose, a measuring ring 36 of standard type is used which is the equivalent of a measurement spindle for measuring the diameter of a shaft. According to the invention, the measuring ring 36 is directly connected by a duct 37 to the end of the first branch 15 of the pneumatic circuit included in the spindle 12. Thus, the transducer 22 enables a comparative measurement of the diameters of the bore 13 and of that of the shaft 35 to be made.

Figure 5:
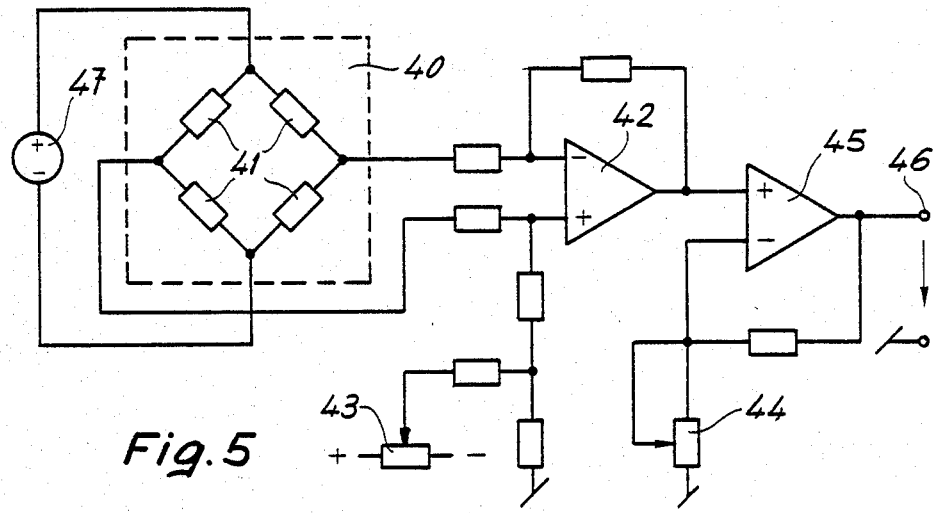
FIG. 5 is a diagram of a supply and control circuit of a transducer of a measuring device according to the invention.

FIG. 5 illustrates a control circuit of the differential pressure transducer used in the device of the invention. That transducer is represented within the dotted line frame 40 by bridge of piezoresistors 41 which are fed by means of a power supply 47, preferably a current source. An operational amplifier 42, one of the inputs of which is controlled by means of an adjustable potentiometer 43 enable a zero adjustment to be made, while the overall amplification is defined by a potentiometer 44 controlling an amplifier 45, at the output 46 of which is the signal representing the measured dimension.

The dimensional and dynamic characteristics of the measuring device of this invention allow it to be applied to numerous types of measurements in the field of machining of workpieces. In particular, it is especially well adapted to be mounted inside the work head of an interior grinder and kinematically connected to the tool-holding head, so as to measure the diameter of the bore of the ground piece on each oscillation of the tool and thus to regulate the feed of the grinding wheel continuously throughout the grinding operation stopping it when the nominal dimension of the bore is reached.

Although it has been described in relation to some of its particular embodiments, this invention is not at all limited thereto, but may be subjected to numerous modifications that will be evident to one of ordinary skill in the art.

What is claimed is:

1. A pneumatic measuring device for measuring dimensions of a workpiece, said device comprising a pneumatic circuit containing a first branch having an inlet nozzle and at least one measuring nozzle and a second branch having an inlet nozzle being connected to a reference outlet nozzle, said first and second branches being connected to a pressure transducer delivering an electric signal representing the difference in pressures between said branches of the pneumatic circuit, a measuring spindle having a surface to which said at least one measuring nozzle is connected and means for connecting the inlet nozzles of said first and second branches to a regulated pressure source, said pressure transducer comprising a differential pressure transducer having a semiconductor element, said pneumatic circuit and said differential pressure transducer being integrally housed within said measuring spindle.

2. A measuring device according to claim 1, wherein said measuring spindle comprises a cylindrical end for measuring the diameter of a bore, said cylindrical end comprising two measuring nozzles being symmetrically disposed to emerge at opposite locations on said cylindrical end.

3. A measuring device according to claim 2, for measuring the diameter of a bore, wherein the reference nozzle and the two inlet nozzles are so dimensioned to form approximately equal pressures in the said two branches of the pneumatic circuit when the diameter of the bore has a standard value.

4. A measuring device according to claim 3, wherein the measuring spindle comprises an interchangeable end in which said measuring nozzles are housed.

5. A measuring device according to claim 2, coupled to a reference shaft, wherein said device comprises a pneumatic measuring ring measuring the diameter of said shaft, said measuring ring being connected to said first branch, said spindle forming a grinder to grind a bore to the dimensions of said reference shaft.

6. A measuring device according to claim 1, for measuring the diameter of a bore, wherein the reference nozzle and the two inlet nozzles are so dimensioned to form approximately equal pressures in the said two branches of the pneumatic circuit when the diameter of the bore has a standard value.

7. A measuring device according to claim 6, wherein the measuring spindle comprises an interchangeable end in which said measuring nozzles are housed.

8. A measuring device according to claim 6, coupled to a reference shaft, wherein said device comprises a pneumatic measuring ring measuring the diameter of said shaft, said measuring ring being connected to said first branch, said spindle forming a grinder to grind a bore to said dimensions of the reference shaft.

9. A measuring device according to claim 1, wherein the measuring spindle comprises an interchangeable end in which said at least one measuring nozzle is housed.

10. A measuring device according to claim 9, coupled to a reference shaft, wherein said device comprises a pneumatic measuring ring measuring the diameter of said shaft, said measuring ring being connected to said first branch, said spindle forming a grinder to grind a bore to the dimensions of said reference shaft.

11. A measuring device according to claim 1, coupled to a reference shaft, wherein said device comprises a pneumatic measuring ring measuring the diameter of said shaft, said measuring ring being connected to said first branch, said spindle forming a grinder to grind a bore to the dimensions of said reference shaft.

* * * * *